UNITED STATES PATENT OFFICE 2,571,568

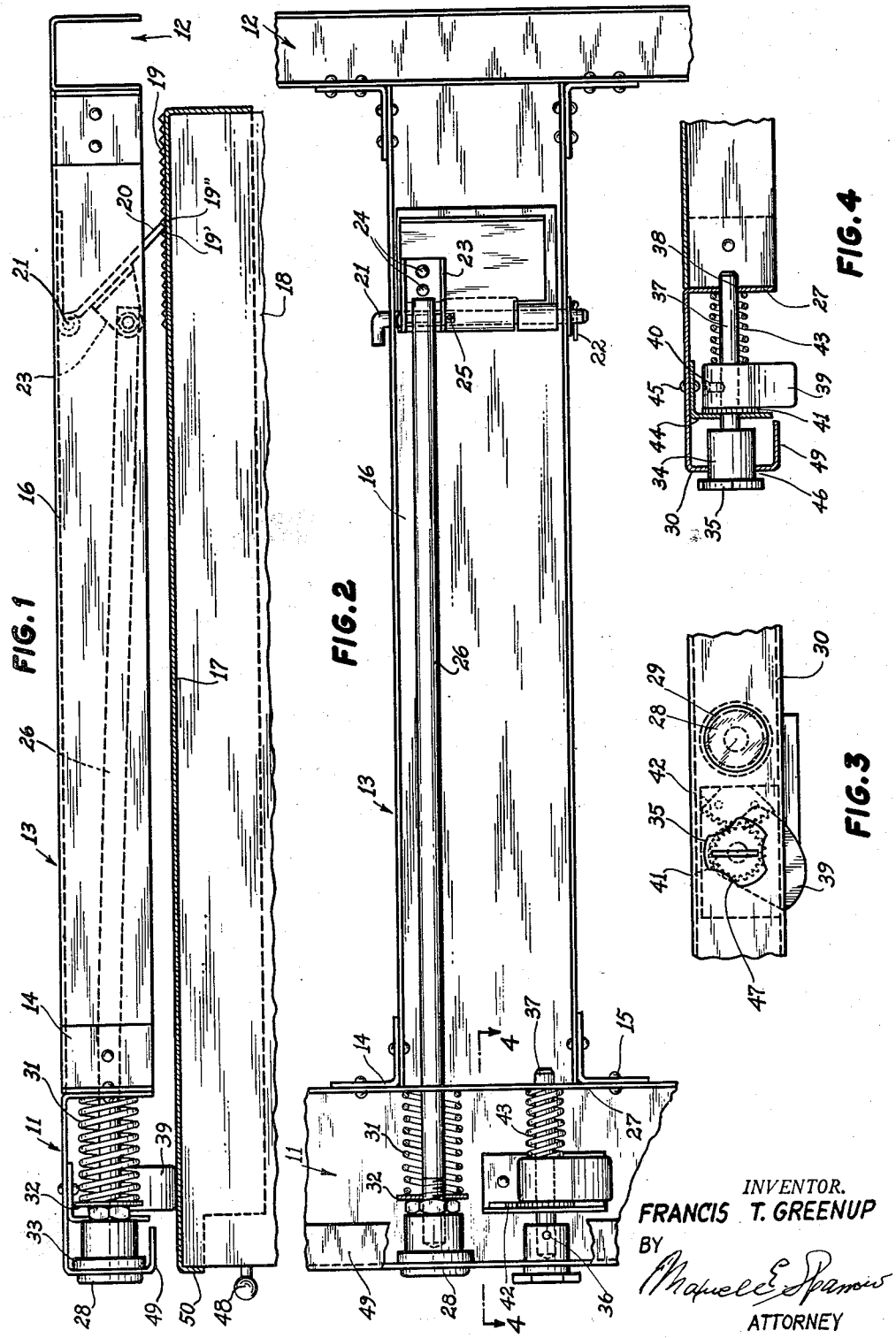

MECHANISM FOR LATCHING A RECEPTACLE AND COVER IN A RECESS

Francis T. Greenup, Merrick, N. Y., assignor to REF Manufacturing Corporation, Mineola, N. Y., a corporation of New York Application May 5, 1948, Serial No. 25,245

7 Claims. (Cl. 292—3)

The present invention relates to locking or holding devices for slide boards, drawers, containers and like objects, and is particularly applicable to the type of container or drawer used in the galley of an airplane or other carrier.

An object of the invention is to provide means for securely locking or holding a slidable object in its place.

Another object of the invention is to provide means for locking the drawers, containers, receptacles, or other like objects of an airplane's or other carrier's galley so as to prevent sliding movement thereof during even the most abrupt maneuvering of the carrier or craft.

Yet a further object is to provide a locking or holding means or device which is adapted to grip the object to be locked, automatically upon its insertion, and to firmly grip the same even when it is not completely inserted in its place or position; to firmly resist removing forces and directly apply these forces as additional security and holding power; and to resist all the vibration harmonics natural to an airplane or other carrier. The device is designed to operate vertically, horizontally or inverted.

A further object of the invention is to provide means for preventing the rattling of the drawers, receptacles or like devices in a galley during movements of the carrier.

Still another object of the invention is to provide conveniently operable anti-rattling and releasing means on a cabinet or rack for the purpose described.

Another object is to provide a hold down device which will provide a wide tolerance of adjustment, which will be quickly and easily adjustable without tools and which will firmly resist forces applied in one plane after adjustment.

Other objects and advantages will be in part obvious from the annexed drawings and in part hereinafter indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying preferred features thereof that they may embody the same by the modifications in structure and relation contemplated by this invention, drawings depicting a certain form of the invention have been annexed as a part of this disclosure, and in such drawings, like characters of reference denote corresponding parts throughout all the views, of which:

Fig. 1 is an elevational view of a locking device according to the invention;

Fig. 2 is a bottom view of the device shown in Fig. 1;

Fig. 3 is a front view of the device; and

Fig. 4 is a fragmentary sectional view taken on line 4—4 of Fig. 2.

A pair of channel members 11 and 12, fixed in any convenient manner to the frame of a rack or cabinet (not shown), have secured thereto one or more locking devices 13, e. g. by means of angle pieces 14 and rivets 15. The device 13 comprises a housing 16, in the form of a channel member, which extends longitudinally of the top or cover 17 of a drawer or a receptacle 18. The cover 17 fits over the receptacle 18 and is at its rear end provided with teeth 19 cooperating with a latch 20 which is pivoted to the housing 16 by means of a pin 21. A cotter pin 22 prevents withdrawal of pin 21 from the housing.

A bracket 23 is secured to the latch 20, as by rivets 24, and is pivoted by means of a pin 25 to a rod 26 which extends into the front channel member 11 through an opening provided in the rear wall 27 of the latter. A knob 28 is threadedly secured to the end of rod 26 and projects through an opening 29 provided in the front wall 30 of channel member 11. An expanding coil spring 31 bears upon the wall 27 and, through a washer 32, upon the knob 28, thereby tending to displace the rod 26 toward the left as viewed in the drawing and forcing the bottom edge of latch 20 into engagement with the teeth 19. The leftward movement of the rod 26 is limited by the abutment of a shoulder 33 of knob 28 against the front wall 30, as well as by the coaction of latch 20 and teeth 19.

From the description given so far it will be apparent that the cover 17 and, through it, the receptacle 18 will be held in place, at least against frontward movement, by the engagement of the teeth 19 with the latch 20, it being understood that suitable abutments (not shown) will be provided to fix the displacement in the opposite direction (toward the right in Figs. 1 and 2). Although only one pair of teeth 19', 19" will play a part in locking the cover 17 in place, it will be appreciated that the greater number of teeth facilitates adjustment of the device and permits the interchanging of drawers from different parts of the same cabinet, or from different cabinets, in the absence of complete uniformity of the respective locking devices.

While the latch 20 prevents both longitudinal movement of the cover 17 and vertical displacement (rattling) of the rear end thereof, it may be desirable to provide special means for positively locking the front end of the cover in like manner. According to a further feature of the invention, therefore, there is provided anti-rattling means operated by means of a button 34 the indented head 35 of which extends in front of the wall 30 of member 11. The button 34 is secured, as by a set screw 36, to a rod 37 which slidably rests in an opening 38 provided in wall 27 of member 11. Rod 37 carries a cam 39 which is secured thereto by means of a set screw 40. Fastened to the cam 39, by means not shown, is a gear 41 adapted to mesh with a sector gear 42 when the rod 37 is in its leftmost position, as viewed in Figs. 2 and 4, the rod being normally forced into this position through the action of an expanding coil spring 43 inserted between the cam 39 and the wall 27. The sector gear 42 is fixed to a bracket 44 which is riveted, as at 45, to the channel member 11.

In the position of cam 39 shown in the drawing, the underside of the cam bears upon the cover 17 (Fig. 1), thereby preventing any vertical movement or rattling. Since the gear 41 is in mesh with the stationary sector gear 42, a rotation of cam 39 to release the cover 17 will not be possible until the two gears have been disengaged by an axial movement of the rod 37 toward the rear, for which purpose sufficient clearance 46 is provided between the head 35 and the wall 30. Thus the cam 39 may be rotated by gripping the head 35 of button 34 with the fingers, pressing the button inwardly, rotating it until the cam 30 is either in operative or in inoperative position as desired, and releasing the button to permit re-engagement of the gear 41 with gear 42. To facilitate this manipulation of button 34, its head 35 is preferably provided with suitable indentations 47 as best shown in Fig. 3.

Thus it will be seen that, in order to withdraw the cover 17 from the position in which it is shown in Fig. 1, it will merely be necessary firstly to swing the cam 39 out of the way by the manipulation of button 34 and secondly to disengage the latch 20 from the teeth 19 by pressing the knob 28. It may be noted, however, that a withdrawal of the receptacle 18, e. g. by means of the handle 48, will be possible after only the button 34 has been operated, by simply lifting the front part of cover 17 until it abuts the inturned lip 49 of front wall 30, whereby the receptacle 18 may be released from the shortened front edge 50 of cover 17 and may be pulled out underneath said edge.

Although the invention has been described with reference to a single, preferred embodiment, this has been done merely by way of illustration, since various modifications and adaptations of the invention will be possible without exceeding the spirit and scope of the invention as defined in the objects and in the appended claims.

For example, the teeth 19 may be applied to or carried by an integral top wall or side wall of a receptacle or container.

I claim:

1. The combination, with a frame having a horizontal recess open at the front and a receptacle slidably received by said recess with a substantial amount of vertical play, said receptacle having a cover which is formed with a relatively shallow flange at least at the forward end thereof to engage over the receptacle, of a device for locking said receptacle in said recess, said device comprising a rearwardly and downwardly inclined latch member pivotally suspended from said frame above the rear portion of said receptacle when the latter is fully inserted into said recess, spring means urging said latch member into engagement with a serrated surface portion of said cover, an operating member for withdrawing said latch member from engagement with said serrated surface portion, and a locking member mounted on said frame above the front portion of said receptacle when the latter is fully inserted into said recess, said locking member being selectively displaceable between an operative position, in which it bears upon the front portion of said cover, and an inoperative position, said locking member in its inoperative position being sufficiently removed from said cover to allow upward tilting movement of said cover to disengage said shallow flange from the front of the receptacle, thereby enabling the withdrawal of said receptacle from underneath said cover.

2. The combination, with a frame having a horizontal recess open at the front and a receptacle fitting into said recess and slidable longitudinally on the bottom of the latter with substantial vertical clearance between the top of said receptacle and the top of said recess, said receptacle having a vertically removable cover formed with a marginal flange relatively shallow at least at the front and engageable over the receptacle to prevent longitudinal displacement of the latter relative to the cover, of first latch means carried by said frame at the top and adjacent the rear of said recess for resilient engagement with the rear portion of the cover to prevent vertical movement of said rear portion of the cover and longitudinal displacement of said cover toward the front, and second latch means carried by said frame at the top and adjacent the front of said recess, said second latch means, when operative, being effective to bear against the front portion of said cover from above and thus prevent lifting of said cover at the front, and when inoperative being raised toward the top of said recess a distance sufficient to permit upward tilting movement of said cover for disengaging said shallow front of the cover flange from the receptacle so that the latter may then be longitudinally removed from said recess.

3. The combination according to claim 2, wherein said cover is formed with a longitudinally arranged series of indentations in the rear portion thereof, and wherein said first latch means includes a latch member pivotally carried by said frame and extending downwardly and rearwardly into said recess for engagement with said indentations.

4. The combination according to claim 3, wherein said first latch means further includes a latch rod longitudinally slidable in said frame and pivotally connected at one end to said latch member with the other end thereof projecting forwardly from said frame to be conveniently grasped for manipulating said latch member, and spring means acting on said latch rod to effect movement of the latter in the direction for swinging said latch member into engagement with said indentations of the cover.

5. The combination according to claim 2, wherein said second latch means includes a cam-shaped member rotatably carried by said frame to project into said recess at the front of the latter, said cam-shaped member in one angular position projecting a radially enlarged portion into said recess operative to bear against said cover and in another angular position presenting a radially reduced portion toward said cover to permit the tilting of the latter, and operating means for selectively disposing said cam-shaped member in each of said angular positions.

6. The combination according to claim 5, wherein said operating means includes a shaft supporting said cam-shaped member and movable axially and rotatably relative to said frame, one end of said shaft projecting forwardly from said frame to be conveniently grasped for manipulation thereof, cooperative locking means carried by said frame and by said shaft to prevent rotation of the latter when the shaft is disposed in one axial position, and spring means acting on said shaft to urge the latter to said one axial position.

7. The combination according to claim 6, wherein said cooperative locking means includes a gear fixed on said shaft for axial and rotational movement with the latter, and a gear segment fixed on the frame in a position to mesh with said gear when said shaft is in said axial position.

FRANCIS T. GREENUP.

REFERENCES CITED

The following references are of record in the file of this patent:

UNITED STATES PATENTS

| Number | Name | Date |
| --- | --- | --- |
| 1,171,185 | Fox | Feb. 8, 1916 |
| 1,261,089 | Yawman | Apr. 2, 1918 |
| 1,275,531 | Clews | Aug. 13, 1918 |
| 1,692,295 | Gerard | Nov. 20, 1928 |
| 1,822,110 | Raymond | Sept. 8, 1931 |
| 1,954,500 | Sparks | Apr. 10, 1934 |
| 2,276,915 | Axe | Mar. 17, 1942 |
| 2,301,282 | Jacobi | Nov. 10, 1942 |
| 2,331,115 | Fox | Oct. 5, 1943 |